United States Patent Office 3,020,133

Patented Feb. 6, 1962

3,020,133
HYDROCARBON GEL

George B. Feild, New Castle, and William H. Markwood, Jr., Wilmington, Del., assignors to Hercules Powder Company, Wilmington, Del., a corporation of Delaware No Drawing. Filed Oct. 15, 1953, Ser. No. 386,398
10 Claims. (Cl. 44—7)

This invention relates to the gelling of hydrocarbon fuels, and more particularly to an improved gelling agent and a process for preparing gelled hydrocarbon compositions.

In comparatively recent years the fire bomb, the incendiary bomb, and the flame thrower have become important military weapons. These weapons have been developed to a high degree of efficiency against personnel, permanent installations, and armor. The incendiary and flame generating compositions employed in these weapons and in various commercial applications, where similar compositions find use, have generally comprised a combustible hydrocarbon and a gelling agent which, when admixed with the hydrocarbon, for example, gasoline, form a gel of the desired consistency. When employed in bombs, and particularly the fire bomb, a large initial fire ball is desirable, followed by a long burning time. Furthermore, the gel should have such a consistency that a large area is burned out by dispersion of the flaming gel particles due to the initial explosion of the bomb.

Probably the best known incendiary composition of this type is napalm, which is gasoline gelled by the aluminum soaps of naphthenic, palmitic, and oleic acids. Although napalm gels have been effective, serious difficulty has been encountered due to the high degree of water sensitivity of the composition and its tendency to cake during storage. The caking difficulties of napalm were overcome by grinding the aluminum soaps of the napalm acids with silica. However, such treatment, while mitigating caking, did not improve the moisture sensitivity and moreover introduced a serious problem of dusting during handling and preparation of the gels for loading into the desired containers. The best thickening agent developed from the standpoint of gelling properties and resistance to both caking and moisture has been the aluminum soap of 2-ethylhexoic acid. However, this composition is an extremely fine, dusty powder with undesirably low bulk density and poor stability at higher temperatures.

Consequently, there is a need for an improved thickener for gelling hydrocarbons which will not only produce a gel of desired properties in ordnance such as fire bombs and flame throwers, but which will resist moisture and caking and is free from dust. The optimum type of thickener or gelling agent would be a liquid which can be prepared in the desired amounts, packaged, and then admixed with the hydrocarbon to be gelled at the actual point of use.

Now in accordance with the present invention, an improved gelling agent and gelling process have been developed. The gels produced in accordance with the invention have characteristics superior to the previously known gels and are characterized by excellent stability. The gelling agents which produce these gels are stable solutions which may be readily admixed with the desired hydrocarbon fuel at the point of use and thus overcome the aforementioned difficulties.

Generally described, the present invention relates to a process for gelling combustible liquid hydrocarbons which comprises admixing with the hydrocarbon aluminum diisopropoxide mono-sec-butoxide and an organic acid having from 6 to 17 carbon atoms. The alkoxide-acid soap is hydrolyzed to form the gel. Also included in the invention are the compound, aluminum diisopropoxide mono-sec-butoxide, and the gelatinous hydrocarbon compositions formed in accordance with the invention.

The mixed aluminum alkoxide which is reacted with the organic acid in order to obtain the improved gelling agent in accordance with the invention may be prepared as in Example 1.

*Example 1*

One hundred parts by weight of aluminum was placed in a reactor with 280 parts of benzene and 0.5 part of mercuric chloride and agitated for 20 to 30 minutes to effect amalgamation of the aluminum. Ten parts of aluminum isopropoxide and 30 parts of sec-butanol were then added and the reactor was fitted with a reflux condenser. The contents of the reactor were then gently refluxed until reaction began to occur as evidenced by evolution of hydrogen and blackening of the reaction mixture by liberation of carbon from the aluminum metal. Two hundred forty-four parts of sec-butanol and 517 parts of isopropanol (10% excess) were then added dropwise and heat was applied to the reactor in an amount causing the reaction to proceed at a desirable rate. After all of the sec-butanol was added, the reactants were refluxed until no more hydrogen was evolved. The reflux condenser was then replaced by a water-cooled distillation column and the benzene and excess alcohols were removed by distillation at atmospheric pressure and finally by vacuum distillation with an aspirator. The water-cooled condenser was then replaced with a short air condenser and the reaction products were then distilled under vacuum. The yield of diisopropoxide mono-sec-butoxide was 713 g. (88.5 theoretical) of clear liquid.

The reaction between aluminum diisopropoxide mono-sec-butoxide, the organic acids, and water in accordance with the invention takes place in accordance with the following equation:

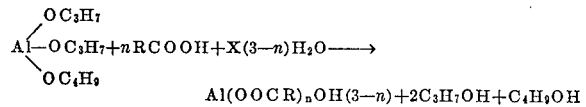

$$Al\begin{cases} OC_3H_7 \\ OC_3H_7 \\ OC_4H_9 \end{cases} + nRCOOH + X(3-n)H_2O \longrightarrow Al(OOCR)_nOH(3-n) + 2C_3H_7OH + C_4H_9OH$$

where R may be straight or branch chain hydrocarbon radicals from 6 to 17 carbon atoms, $n$ may be from 1.75 to 2.50 mole equivalents per 1.0 mole of alkoxide, and X may be from 50% to 125% of 3-$n$ (theoretical) water. In accordance with the invention, combustible liquid hydrocarbons may be gelled either by the concentrate method or by being produced in situ in the hydrocarbon to be gelled.

In accordance with the concentrate method, an anhydrous solution of the soap formed by reacting the mixed alkoxide and organic acid is formed and such a solution is added to the hydrocarbon to be gelled. Such solutions are best prepared by reacting aluminum diisopropoxide mono-sec-butoxide and the desired amount of organic acid in a hydrocarbon solvent, preferably gasoline or the hydrocarbon to be gelled. This solution is then added to the hydrocarbon to be gelled, followed by the addition of water to hydrolyze the soap. The concentrate may be prepared as in Example 2.

*Example 2*

Aluminum diisopropoxide mono-sec-butoxide, prepared as in Example 1, was dissolved in an equal weight of gasoline and dried to form an anhydrous solution. A second anhydrous solution was formed by dissolving 2-ethylhexoic acid in an equal weight of gasoline. Concentrates were formed by combining the two solutions in proportions calculated to produce molar ratios of acid to alkoxide of 2 and 2.5, respectively. Six percent by weight of each concentrate thus formed was dispersed in gasoline with stirring. One hundred percent of the theoretical water necessary for hydrolysis of the soap was then added with additional stirring. The mixtures were allowed to stand until good, strong, stringy gels were obtained.

The concentrate solution is limited, however, to about 25% to 30% solids at normal temperatures since higher solids contents result in high viscosities which render the concentrate difficult to disperse in the hydrocarbon to be gelled. The concentrate solution is preferably packaged in unit quantities, the desired number of which are then added to the hydrocarbon to be gelled and dispersed. The necessary water to hydrolyze the soap is then added and the gel is formed. The concentrate method is advantageous in that only the soap solution need be packaged and water may be readily obtained in most instances at the point of admixture. However, the concentrate method may be undesirable in some instances due to the low soap concentrations permissible. Because of the low permissible solid concentrations larger quantities of the gelling concentrate are necessary. The concentrate method also requires the addition of a critical amount of water which, in some cases, is dispersed with difficulty unless high speed agitation means is available.

The preferred method of forming the hydrocarbon gels in accordance with the invention is by preparing two solutions for addition to the hydrocarbon to be gelled. The first solution will contain the acid, the water, and an amount of isopropanol about nine times the amount of water. The second solution contains the alkoxide dissolved in toluol or other suitable solvent, preferably hydrocarbon, which is desirably nonfreezing at temperatures of −50° F. Such solvents include gasoline, kerosene, n-heptane, and m-xylene. Benzene and other materials having higher freezing points are operable as long as the solution is not exposed to temperatures causing the solvent to freeze prior to use. In this manner the critical amount of water for hydrolysis can be included in the prepackaged component and the alkoxide can be dissolved in the toluol solution in much greater concentrations. The two solutions in accordance with the invention possess the requisite stability over the range of temperatures which can reasonably be expected to be encountered in either polar or tropical conditions when the desirably low freezing solvent for the alkoxide is used. The excess isopropanol employed in the first solution and the toluol or other solvent in the second solution have no deleterious effect on the gel and in fact the former exercises a beneficial peptizing action which enhances the consistency of the final gel. Since it is desirable to employ solutions having the highest possible solids content in the interest of economy in handling and shipping, it is preferred that the alkoxide-toluol solution contain about 75% alkoxide.

The two solutions may be added to the hydrocarbon to be gelled in any desired order, although it is preferred to initially disperse the acid-water-isopropanol solution in the hydrocarbon and subsequently admix the alkoxide-solvent solution with agitation.

Having generally described the invention, more specific examples of preferred gels and methods are presented for the purpose of more specific illustration and to demonstrate the excellence of characteristics and performance of these gels.

*Example 3*

A 100-gal. fire bomb was prepared which contained 92.5 gallons of gasoline and gelled by initially dispersing therein 3.2 gallons of diisopropoxide mono-sec-butoxide/toluol solution (72/24). Three and two-tenths gallons of a solution containing 2 molar equivalents of C8 acid (Standard Oil Company of Indiana—L–9211)-water (80% of theoretical water necessary to hydrolyze the soap)-isopropanol (9 times the amount of water) was then added with agitation. The consistency of the gel after formulation in the bomb was excellent, exhibiting the optimum stringiness required for this type of ordnance. The bomb was dropped from an altitude of 100 feet with a forward speed of 300–310 miles per hour. The duration of the initial fire ball was 4.2 seconds, the burning time was 8 minutes 7 seconds and the burned-out area was 89 yards by 38 yards.

*Example 4*

A 100-gal. fire bomb similar to that of Example 3 was prepared. This bomb was loaded with 100.7 gallons of gel formed from 93 gallons of gasoline and 7.7 gallons of thickener. In this bomb 3 gallons of the alkoxide-toluol solution of Example 3 was employed and 4.7 gallons of acid-isopropanol-water solution was employed. The acid-water-isopropanol solution employed was similar to that employed in Example 3, except that the acid was a C8 acid prepared in the laboratory by the oxidation of hexene. This fire bomb was also dropped from an altitude of 100 feet at a forward speed of 300–310 miles per hour. The duration of the fire ball was 4.7 seconds, the burning time was 7 minutes 24 seconds, and the burned-out area measured 219 yards by 26 yards.

As indicated, the organic acid employed may be straight or branch chain acids having from 6 to 17 carbon atoms. It has been found that when acids having less than 6 carbon atoms are used, gels may be formed using comparatively less acid. However, such gels are too brittle and are therefore unsatisfactory. As the number of carbon atoms in the acid increases, the gels become more fluid and correspondingly more acid must be employed. Gels in which acids have been used having more than 17 carbon atoms are too fluid and unsatisfactory. Moreover, such acids must be employed in such great quantity to obtain gels that the burning characteristics and ignitability of the gels are undesirably affected. Acids having from 7 to 9 carbon atoms are preferred, both because of performance and economy. Examples of operable acids are the fatty acid series above caproic, such as enanthylic, caprylic, pelargonic, capric, hendecanoic, n-heptanoic, 2-methyl hexanoic, lauric, tridecoic, myristic, pentadecanoic, palmitic, margaric, stearic, nondecylic, arachidic, behenic, carnaubic, hyenic, carboceric, cerotic, lacceroic, melissic, montanic, oleic, and psyllic. Unsaturated acids such as the acrylic and acetylene acids, sorbic acid, linoleic acid, and the like may also be employed. Aromatic acids such as naphthenic are also operable. The preferred acids, however, are 2-ethylhexoic, the napalm acids, and the synthetic acids of the fatty acid type which are prepared, for example, by oxidation of individual or mixed olefins. Such synthetic acids are usually a mixture of straight chain acids having from about 6 to about 13 carbon atoms. Particularly effective are a C8 acid and a C9 acid prepared by Standard Oil Company of Indiana under the designations "L–9211" and "L–9296," respectively. It has further been found that gel strengths could be improved by adding a small amount of, for example, .5% to 3% of dimerized rosin or its derivatives.

The amount of thickening agent employed to produce the gelled hydrocarbon in accordance with the invention will of course depend upon the initial viscosity of the hydrocarbon and the stiffness desired in the final product. For use in ordinary combustible gels, however, the amount employed will normally range between about 2% and about 10%.

In preparing the gels having the most desirable consistencies it has been found that optimum results are obtained when the aluminum soap is formed from about two mole equivalents of acid based on the aluminum alkoxide and the amount of water is about 80% of the theoretical water required for hydrolysis of the soap. These proportions give excellent consistencies, stabilities, and stringiness.

For most military purposes the hydrocarbon gelled will be gasoline. However, it is to be understood that the invention is not so limited but that any combustible liquid hydrocarbon may be employed such as solvent naphtha, kerosene, toluene, benzene, petroleum oils, and the like. While the invention is particularly illustrated and described with respect to its military applications, it is not so limited and the compositions and processes of the invention may be applied in the production of commercial combustible hydrocarbon gels as may be desired. In view of the possible modifications of the invention, it is intended that it be limited only by the scope of the appended claims.

What we claim and desire to protect by Letters Patent is:

1. A composition of matter consisting essentially of a combustible liquid hydrocarbon and a hydrolyzed reaction product represented by the formula $$Al(OOCR)_nOH_{(3-n)}$$

where R is a member of the class consisting of straight and branch chain hydrocarbon radicals containing from 6 to 17 carbon atoms and $n$ is from 1.75 to 2.50 mole equivalents per mole of aluminum.

2. The composition of claim 1 wherein said combustible liquid hydrocarbon is gasoline.

3. The composition of claim 1 wherein said combustible liquid hydrocarbon is naphtha.

4. The composition of claim 1 wherein said combustible liquid hydrocarbon is kerosene.

5. The composition of claim 1 wherein said combustible liquid hydrocarbon is petroleum oil.

6. A process for gelling a combustible liquid hydrocarbon comprising introducing therein a hydrolyzed reaction product represented by the formula $$Al(OOCR)_nOH_{(3-n)}$$

where R is a member of the class consisting of straight and branch chain hydrocarbon radicals containing from 6 to 17 carbon atoms and $n$ is from 1.75 to 2.50 mole equivalents per mole of aluminum in an amount to give a final concentration of said reaction product of between about 2% and about 10%.

7. The process according to claim 6 in which said combustible liquid hydrocarbon is gasoline.

8. The process according to claim 6 in which said combustible liquid hydrocarbon is naphtha.

9. The process according to claim 6 in which said combustible liquid hydrocarbon is kerosene.

10. The process according to claim 6 in which said combustible liquid hydrocarbon is petroleum oil.

References Cited in the file of this patent

UNITED STATES PATENTS

| | | |
|---|---|---|
| 2,327,815 | Niedercorn et al. | Aug. 24, 1943 |
| 2,522,641 | Schmerling | Sept. 19, 1950 |
| 2,618,536 | Hunn | Nov. 18, 1952 |
| 2,666,076 | Rex et al. | Jan. 12, 1954 |
| 2,668,098 | Alm | Feb. 2, 1954 |
| 2,687,423 | Mesirow | Aug. 24, 1954 |
| 2,751,284 | Hill et al. | June 19, 1956 |